(12) United States Patent
Yan et al.

(10) Patent No.: US 11,742,688 B2
(45) Date of Patent: Aug. 29, 2023

(54) CHARGING DEVICE AND CHARGING CONTROL METHOD

(71) Applicant: Delta Electronics (Shanghai) Co., Ltd., Shanghai (CN)

(72) Inventors: Chao Yan, Shanghai (CN); Hongyang Wu, Shanghai (CN); Liping Sun, Shanghai (CN); Yiwen Lu, Shanghai (CN)

(73) Assignee: DELTA ELECTRONICS (SHANGHAI) CO., LTD., Shanghai (CN)

( * ) Notice: Subject to any disclaimer, the term of this patent is extended or adjusted under 35 U.S.C. 154(b) by 477 days.

(21) Appl. No.: 16/851,073

(22) Filed: Apr. 16, 2020

(65) Prior Publication Data
US 2020/0336000 A1    Oct. 22, 2020

(30) Foreign Application Priority Data

Apr. 18, 2019   (CN) .......................... 201910314581.9
Dec. 25, 2019   (CN) .......................... 201911360833.8

(51) Int. Cl.
*H02J 7/04*    (2006.01)
*H02J 3/01*    (2006.01)
*H02J 3/18*    (2006.01)

(52) U.S. Cl.
CPC .................. *H02J 7/04* (2013.01); *H02J 3/01* (2013.01); *H02J 3/18* (2013.01)

(58) Field of Classification Search
CPC .................. H02J 7/04; H02J 3/01; H02J 3/18
USPC ....................................................... 320/107
See application file for complete search history.

(56) References Cited

U.S. PATENT DOCUMENTS

| | | | |
|---|---|---|---|
| 10,131,239 B2 | 11/2018 | Herke et al. | |
| 2011/0234020 A1 | 9/2011 | Lai et al. | |
| 2012/0068663 A1* | 3/2012 | Tanikawa | B60L 53/14 |
| | | | 320/109 |

(Continued)

FOREIGN PATENT DOCUMENTS

| | | |
|---|---|---|
| CN | 101009431 A | 8/2007 |
| CN | 101170284 A | 4/2008 |

(Continued)

OTHER PUBLICATIONS

Corresponding China Office Action dated Jul. 15, 2021.

(Continued)

*Primary Examiner* — Daniel Kessie
*Assistant Examiner* — Dru M Parries
(74) *Attorney, Agent, or Firm* — CKC & Partners Co., LLC

(57) ABSTRACT

The present disclosure provides a charging device and a charging control method, and the device includes a transformer, a charger, an energy regulator, and a controller; the primary winding of the transformer is connected to the power distribution network, the power distribution network provides a first input power for the charging device; the secondary winding of the transformer is connected to an AC side of the charger and the AC side of the energy regulator respectively; the power required on the AC side of the charger is a second input power; the controller is connected to the energy regulator to control the AC side current of the energy regulator, so as to compensate the power difference between the second input power and the first input power.

19 Claims, 13 Drawing Sheets

(56) References Cited

U.S. PATENT DOCUMENTS

| | | |
|---|---|---|
| 2013/0020989 A1 | 1/2013 | Xia et al. |
| 2015/0372499 A1* | 12/2015 | Purcarea ............ H02J 7/342 |
| | | 307/104 |
| 2017/0077698 A1 | 3/2017 | Liu |
| 2018/0290548 A1* | 10/2018 | Kalkmann ............ B60L 53/14 |

FOREIGN PATENT DOCUMENTS

| | | |
|---|---|---|
| CN | 101286639 A | 10/2008 |
| CN | 101951008 A | 1/2011 |
| CN | 201956919 U | 8/2011 |
| CN | 102280881 A | 12/2011 |
| CN | 202094811 U | 12/2011 |
| CN | 102545221 A | 7/2012 |
| CN | 102738810 A | 10/2012 |
| CN | 103023043 A | 4/2013 |
| CN | 203166553 U | 8/2013 |
| CN | 103683305 A | 3/2014 |
| CN | 103595063 B | 3/2016 |
| CN | 205489525 U | 8/2016 |
| CN | 105932893 A | 9/2016 |
| CN | 105958521 A | 9/2016 |
| CN | 106230262 A | 12/2016 |
| CN | 205960661 U | 2/2017 |
| CN | 108879738 A | 11/2018 |
| CN | 208094255 U | 11/2018 |
| CN | 109617044 A | 4/2019 |
| CN | 109617424 A | 4/2019 |
| EP | 2907227 A2 | 8/2015 |
| WO | 2016037419 A1 | 3/2016 |

OTHER PUBLICATIONS

Corresponding China Office Action dated Aug. 2, 2021.
Corresponding China Office Action dated Apr. 22, 2022.
The Office Action of U.S. Appl. No. 16/851,089 dated Feb. 16, 2022.
Corresponding China Notice of Allowance dated Oct. 25, 2022.

* cited by examiner

US 11,742,688 B2

CHARGING DEVICE AND CHARGING CONTROL METHOD

CROSS-REFERENCE TO RELATED APPLICATIONS

The present application claims priority to Chinese patent application No. 201911360833.8, filed on Dec. 25, 2019 and Chinese Patent Application No. 201910314581.9, filed on Apr. 18, 2019, which are incorporated by reference in their entireties.

TECHNICAL FIELD

The present disclosure relates to the technical field of electric vehicles, in particular, to a charging device and a charging control method.

BACKGROUND

With the increasingly serious environmental problems, many countries around the world have formulated policies to support the development of electric vehicles (EV), and the supporting EV charging system has also been continuously improved. The input side of a charging system (whether a DC charging system or an AC charging system) is connected to the power grid. For reasons of the quality of the power grid, higher power factor and smaller harmonic content should be ensured on the input side of the charging system. The DC charging system is often used for high power quick charging applications.

SUMMARY

The present disclosure provides a charging device and a charging control method, which achieves high power output of the charging system on the basis of reducing hardware costs and space costs as much as possible, while ensuring the quality of grid-connection, reducing the load on the public power grid, and ensuring the stable and efficient operation of the high power charging equipment.

In a first aspect, the present disclosure provides a charging device, including: a transformer, a charger, and an energy regulator; the primary winding of the transformer is connected to the power distribution network, the power distribution network provides a first input power for the charging device; the secondary winding of the transformer is connected to the AC side of the charger and an AC side of the energy regulator respectively; the power required on the AC side of the charger is a second input power; the AC side current of the energy regulator is controlled to compensate the power difference between the second input power and the first input power.

In a second aspect, the present disclosure provides a charging control method that is based on a charging device, where the charging device includes: a transformer, a charger, and an energy regulator, where the primary winding of the transformer is connected to the power distribution network; the secondary winding of the transformer is respectively connected to the AC side of the charger and the AC side of the energy regulator; the method includes: the power distribution network provides a first input power for the charging device; the power required on the AC side of the charger is a second input power; an AC side current of the energy regulator is controlled to compensate the power difference between the second input power and the first input power.

The present disclosure provides a charging device and a charging control method. In the charging device, the energy regulator is connected to a secondary winding of a transformer, and controls, using a controller, an AC side current of the energy regulator to compensate the power difference between the second input power and the first input power. Compared with existing charging devices, this charging device achieves high power output of the charging system on the basis of reducing hardware costs and space costs as much as possible, while ensuring the quality of grid-connection, reducing the load on the public power grid, and ensuring the stable and efficient operation of the high power charging equipment.

DESCRIPTION OF EMBODIMENTS

In order to more clearly illustrate embodiments of the present disclosure or technical solutions in the prior art, accompanying drawings required for describing the embodiments or the prior art will be briefly described below. Obviously, the accompanying drawings in the following description are some of the embodiments of the present disclosure, and other drawings can be obtained by those skilled in the art based on these accompanying drawings without any creative effort.

Figure 1:
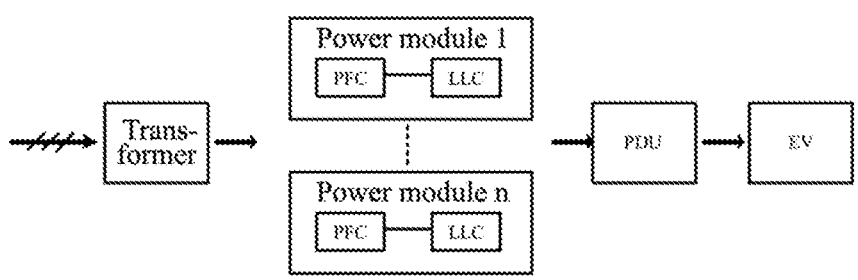
FIG. 1 is a schematic structural diagram of a charging system in the prior art.
Figure 2:
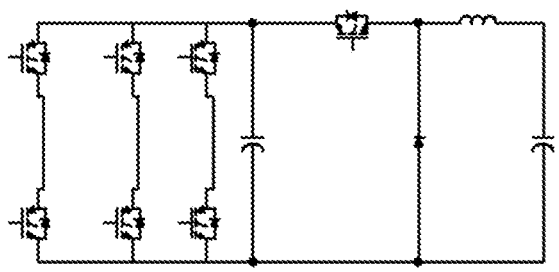
FIG. 2 is a circuit diagram of a power module in the charging system shown in FIG. 1.

FIG. 1 is a schematic structural diagram of a charging system in the prior art. As shown in FIG. 1, the charging system comprises a transformer, multiple power modules, and a Power Distribution Unit (PDU). A Power Factor Correct (PFC) circuit is provided at a first stage of each power module. Adding a separate PFC circuit to each power module can ensure that the charging system has better power factor and smaller harmonics under different loads. However, this will lead to an increase in cost, volume and weight, and the PFC circuit will affect the overall charging efficiency. FIG. 2 is a circuit diagram of a power module in the charging system shown in FIG. 1, which is provided with a PFC circuit. The control of the circuit in the circuit diagram is complicated, and a full-control device is required, so the cost is high.

Figure 3:
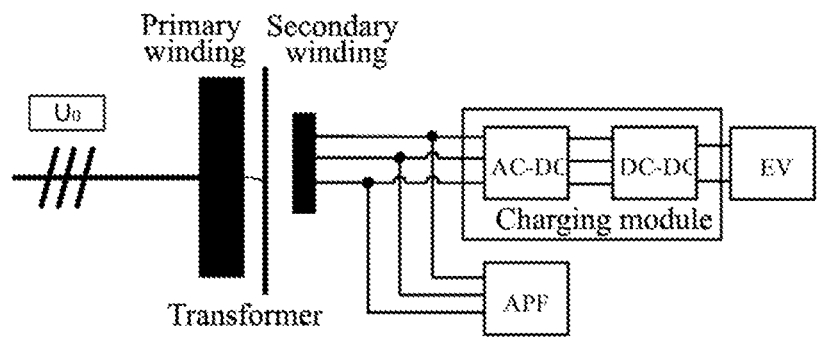
FIG. 3 is a schematic structural diagram of another charging system in the prior art.
Figure 4:
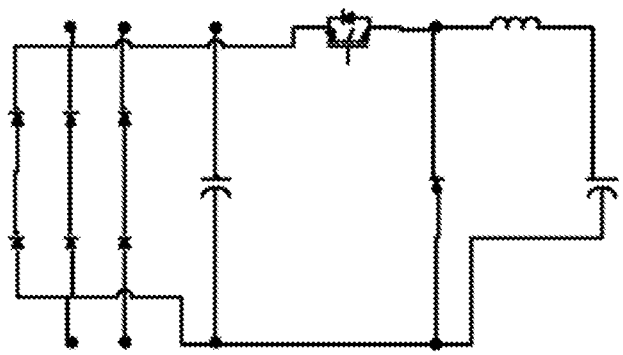
FIG. 4 is a circuit diagram of a charging module in the charging system shown in FIG. 3.

FIG. 3 is a schematic structural diagram of another charging system in the prior art. As shown in FIG. 3, the charging system comprises a transformer, a charging module, and an active filter. The active filter is connected in parallel with the charging module, and is used to perform harmonic compensation on the system network current. FIG. 4 is a circuit diagram of a charging module in the charging system shown in FIG. 3. As shown in FIG. 4, the PFC circuit is not set. Adding active filter to improve power factor and reduce harmonics is suitable for high power systems of multiple parallel units. This can effectively reduce the cost and volume of a single charging module and increase the power density of the charging system. However, for small power charging systems with fewer parallel units, additional active filter modules will increase the overall size and cost of the charging system.

Another existing solution is to add energy storage units to the charging system. However, in this solution, the energy storage units only provide active power to share the load of the power grid, but do not provide the functions of power factor correction and harmonic compensation for the whole charging system. Moreover, the charging system is of a distributed structure, so a detection circuit must be added on the input side of each charging circuit, thereby increasing the hardware cost.

The present disclosure provides a charging device and a charging control method, which achieves high power output of the charging system on the basis of reducing hardware costs and space costs as much as possible, while ensuring the quality of grid-connection, reducing the load on the public power grid, and ensuring the stable and efficient operation of the high power charging equipment. The present disclosure proposes a solution of charging and storing in one; by adding an energy storage unit in the charging device, the capacity of the power grid is expanded, and such energy storage unit can perform power factor correction and harmonic compensation on the entire charging device at the same time. The charging device includes a transformer, a charger, and an energy storage unit. The secondary winding of the transformer is connected to the AC side of the charger and the AC side of the energy storage unit, and the primary winding of the transformer is connected to a power distribution network. The DC side of the charger is connected to the charging equipment. The energy storage unit may include an energy regulator only to compensate the harmonic component and reactive component in the charging current, and perform power factor correction and harmonic compensation on the charging device. The energy storage unit may include an energy regulator and an energy storage element to compensate the active component, harmonic component and reactive component in the charging current, to expand the capacity of the power grid, and to perform power factor correction and harmonic compensation on the charging device at the same time. The energy regulator can be an inverter of various structures.

Figure 5:
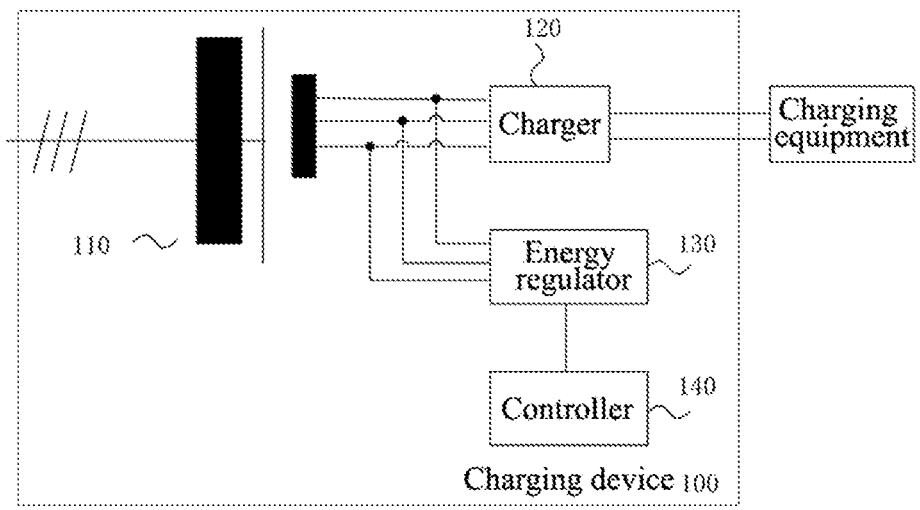
FIG. 5 is a schematic structural diagram of a charging device according to an exemplary embodiment of the present disclosure.

FIG. 5 is a schematic structural diagram of a charging device according to an exemplary embodiment of the present disclosure. As shown in FIG. 5, this embodiment provides a charging device 100, the charging device 100 includes a transformer 110, a charger 120, an energy regulator 130, and a controller 140. In this embodiment, the transformer 110 includes a set of primary windings and a set of secondary windings, and the converter in the charger 120 is an isolated converter.

In the above charging device 100, the secondary winding of the transformer 110 is connected simultaneously to the AC side of the charger 120 and the AC side of the energy regulator 130, the primary winding of the transformer 110 is used to connect to the power distribution network, the DC side of the charger 120 is used to connect to the charging equipment, and the output end of the controller 140 is connected to the energy regulator 130.

In the above charging device 100, the power distribution network provides a first input power for the charging device 100, the power required on the AC side of the charger 120 is a second input power, the controller 140 generates a compensation instruction to control the AC side current of the energy regulator 130, and the AC side current of the energy regulator 130 is used to compensate the power difference between the second input power required on the AC side of the charger 120 and the first input power output by the power distribution network.

Further, the first input power and the second input power in this embodiment are the apparent power.

In the charging device provided in this embodiment, the AC side current of the energy regulator is controlled so as to compensate the power difference between the second input power required on the AC side of the charger and the first input power output by the power distribution network. The charging device of this embodiment achieves high power output of the charging system on the basis of reducing hardware costs and space costs as much as possible, while ensuring the quality of grid-connection, reducing the load on the public power grid, and ensuring the stable and efficient operation of the high power charging equipment.

Figure 6:
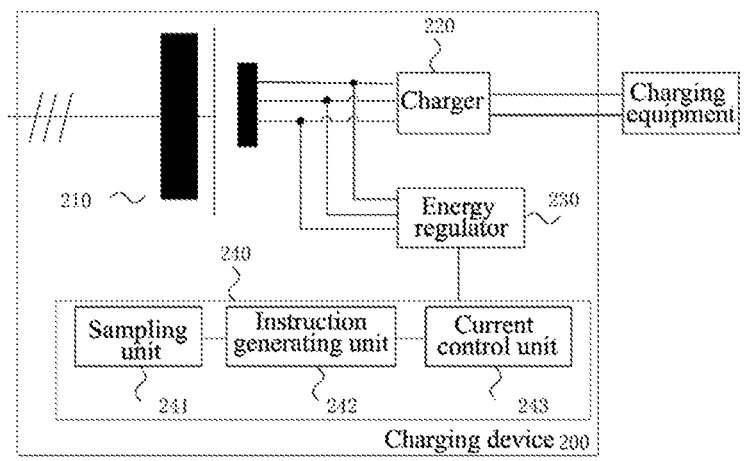
FIG. 6 is a schematic structural diagram of a charging device according to another exemplary embodiment of the present disclosure.

FIG. 6 is a schematic structural diagram of a charging device according to another exemplary embodiment of the present disclosure. As shown in FIG. 6, this embodiment provides a charging device 200, the charging device 200 includes a transformer 210, a charger 220, an energy regulator 230, and a controller 240.

In the above charging device 200, the controller 240 includes a sampling unit 241, an instruction generating unit 242, and a current control unit 243. The first sampling end of the sampling unit 241 is located on the AC side of the energy regulator 230 to collect the AC side current of the energy regulator 230, and a second sampling end of the sampling unit 241 is located on the primary side of the transformer 210 to collect the primary side current of the transformer 210. The total charging current can be obtained by subtracting the AC side current of the energy regulator 230 from the primary side current of the transformer 210.

It should be noted that the AC side current of the energy regulator 230 used for calculation in the disclosure refers to the current that is converted on the primary side of the transformer 210 from the actual sampling current. Since it is a common technology to convert the AC side current of the energy regulator 230 obtained by sampling to the primary side, it will not be repeated herein; by default, the AC side current of the energy regulator 230 used for calculation is the current converted to the primary side.

The input end of the instruction generating unit 242 is connected to the output end of the sampling unit 241, and the input end of the current control unit 243 is connected to the output end of the instruction generating unit 242. The instruction generating unit 242 is used to extract the harmonic current and reactive current in the total charging current, take a reversed value of the harmonic current as a harmonic compensation instruction and take a reversed value of the reactive current as a reactive compensation instruction, and superimpose the harmonic compensation instruction with the reactive compensation instruction to generate a compensation instruction. The current control unit receives the compensation instruction, and controls the AC side current of the energy regulator according to the compensation instruction, so that the current control unit is enabled to track the compensation instruction, so as to compensate the power difference between the second input power and the first input power. The power difference compensation includes harmonic component compensation and reactive component compensation.

Figure 7:
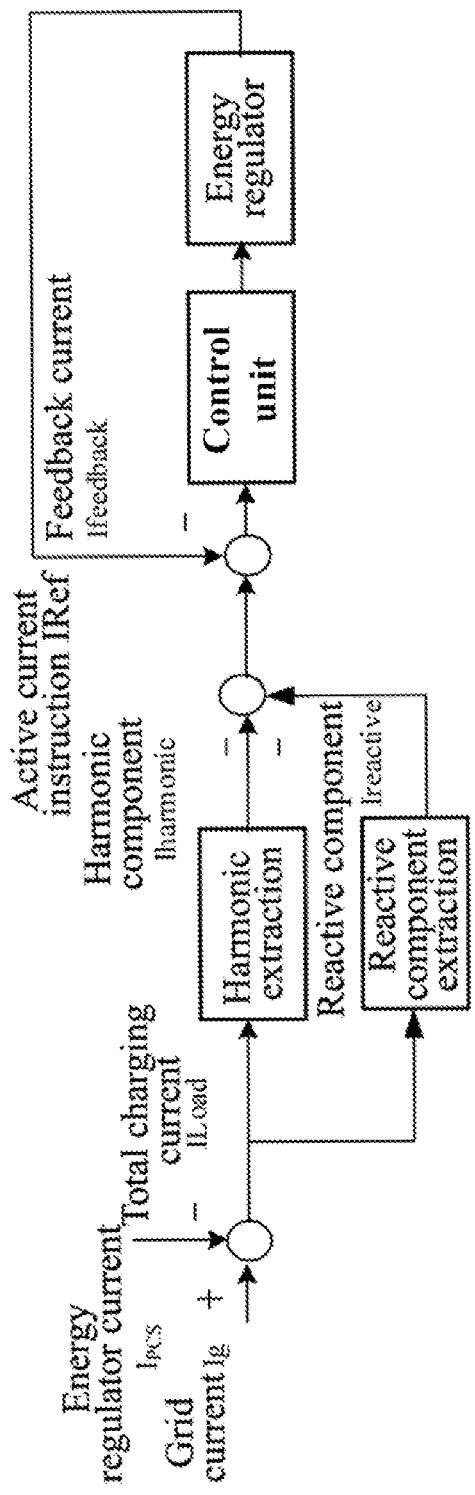
FIG. 7 is a control principle diagram of a controller in a charging device according to the embodiment shown in FIG. 6 of the present disclosure.

FIG. 7 is a control principle diagram of the controller in the charging device according to the embodiment shown in FIG. 6 of the present disclosure. As shown in FIG. 7, the current Ig on the primary side of the transformer is used as an input to the adder, the inversion of the AC side current $I_{PCS}$ of the energy regulator is used as the other input to the adder, and the adder outputs the total charging current ILoad. The total charging current ILoad obtains the harmonic component Iharmonic through the harmonic extraction unit, and obtains the reactive component Ireactive through the reactive component extraction unit. A reversed value of the harmonic component Iharmonic is used as the harmonic compensation instruction, and a reversed value of the reactive component Ireactive is used as the reactive compensation instruction.

The harmonic compensation instruction is used as one input to the adder, the reactive compensation instruction is used as the other input to the adder, and the adder outputs the compensation instruction.

After obtaining the current instruction IRef, a current control unit is used to control the AC side current of the energy regulator 230, which makes the AC side current of the energy regulator 230 track the compensation instruction so as to realize the harmonic component compensation and reactive component compensation.

In the charging device provided in this embodiment, the AC side current of the energy regulator and the primary side current of the transformer are collected by the sampling unit to calculate the total charging current, and the reactive compensation instruction and harmonic compensation instruction are obtained by extracting the harmonic component and reactive component of the total charging current, so as to generate the compensation instruction, thereby realizing harmonic component compensation and reactive component compensation.

Figure 8:
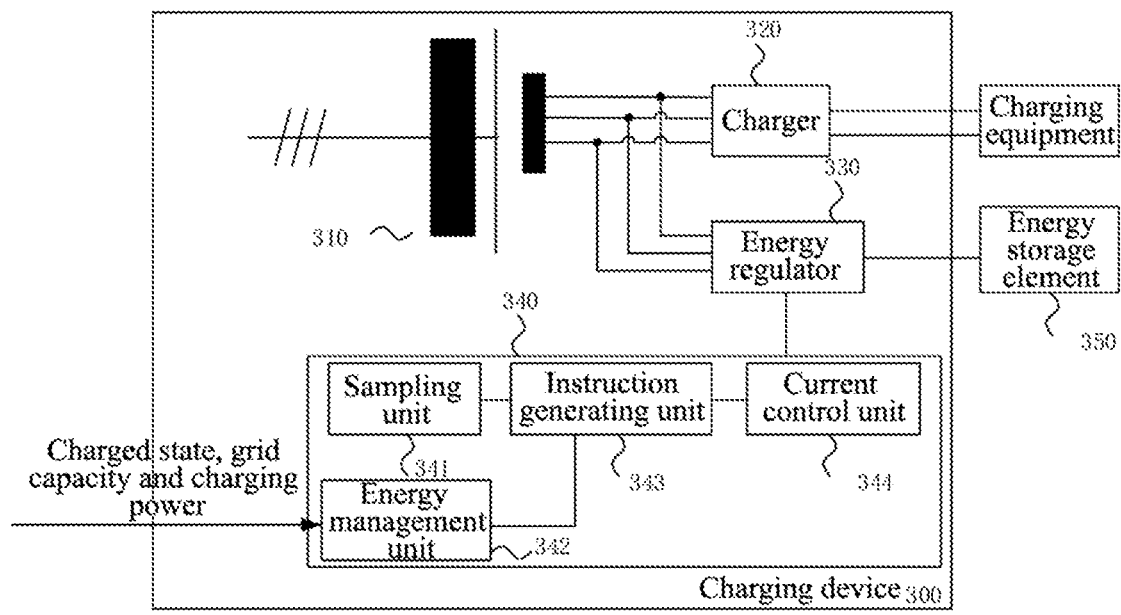
FIG. 8 is a schematic structural diagram of a charging device according to yet another exemplary embodiment of the present disclosure.

FIG. 8 is a schematic structural diagram of a charging device according to yet another exemplary embodiment of the present disclosure. As shown in FIG. 8, a charging device 300 provided in this embodiment includes a transformer 310, a charger 320, an energy regulator 330, a controller 340, and an energy storage element 350.

In the above charging device 300, one set of secondary windings of the transformer 310 is connected to the AC end of the charger 320, and the other set of secondary windings thereof is connected to the AC side of the energy regulator 330; the primary winding of the transformer 310 is used to connect to the power distribution network, the DC side of the charger 320 is used to connect to the charging equipment, the output end of the controller 340 is connected to the energy regulator 330, and the DC side of the energy regulator 330 is connected to the energy storage element 350.

In the above charging device 300, the power distribution network provides a first input power for the charging device 300, the power required on the AC side of the charger 320 is a second input power, the controller generates a compensation instruction to control the AC side current of the energy regulator 330, and the AC side current of the energy regulator 330 is used to compensate the power difference between the second input power required on the AC side of the charger 320 and the first input power output by the power distribution network.

Further, the first input power and the second input power in this embodiment are the apparent power.

In the above charging device 300, the controller 340 includes a sampling unit 341, an energy management unit 342, an instruction generating unit 343, and a current control unit 344. The first sampling end of the sampling unit 341 is located on the AC side of the energy regulator 330 to collect the AC side current of the energy regulator 330, a second sampling end of the sampling unit 341 is located on the primary side of the transformer 310 to collect the primary side current of the transformer 310, and the total charging current can be obtained by subtracting the AC side current of the energy regulator 330 from the primary side current of the transformer 310.

It should be noted that when the charger contains only a single charging unit for powering a charging equipment, the second sampling end of the controller 340 collects the secondary side current of the transformer 310. The total charging current can be obtained by subtracting the AC side current of the energy regulator 330 (it is not required to be converted to the primary side) from the secondary side current of the transformer 310.

The energy management unit 342 is used to obtain the capacity of the power distribution network, the charging power of the charger 330, and the charged state of the energy storage element 350, to obtain an active power adjustment instruction according to the capacity of the power distribution network, the charging power, and the charged state, and then to obtain the active current instruction by the active power adjustment instruction.

If the general application environment is determined, the capacity of the power distribution network is fixed and can be directly input to the energy management unit 342. The energy management unit 342 communicates with the charger 320 or with each charging unit in the charger 320 to obtain the charging power of the charger 320. Specifically, the charging unit communicates with a corresponding load or a charging equipment (such as an electric vehicle, a charging pile) to obtain the charging requirement of each load. All charging requirements are added to obtain the charging power, and the charging power is uploaded to the controller 340. Collect electrical signals at the output end of the energy storage element 350 (such as the output voltage of the energy storage element 350) or communicate with the battery management system (BMS) of the energy storage element 350 to obtain the charged state of the energy storage element 350. Of course, the charging power and the charged state of the energy storage element 350 can also be obtained by directly sampling the electrical signal, which is not limited here.

The first input end of the instruction generating unit 343 is connected to the output end of the sampling unit 341. The second input end of the instruction generating unit 343 is connected to the output end of the energy management unit 342. The instruction generating unit 343 is used for extracting the harmonic current and reactive current in the total charging current, taking a reversed value of the harmonic current as a harmonic compensation instruction, taking a reversed value of the reactive current as a reactive compensation instruction, and superimposing the harmonic compensation instruction, the reactive compensation instruction and the active current instruction output by the energy management unit 342 to generate a compensation instruction.

The input end of the current control unit 344 is connected to the output end of the instruction generating unit 343 to control the AC side current of the energy regulator 330 according to the compensation instruction, so that the AC side current of the energy regulator 330 tracks the compensation instruction to realize the active component compensation, the harmonic component compensation and the reactive component compensation.

Figure 9:
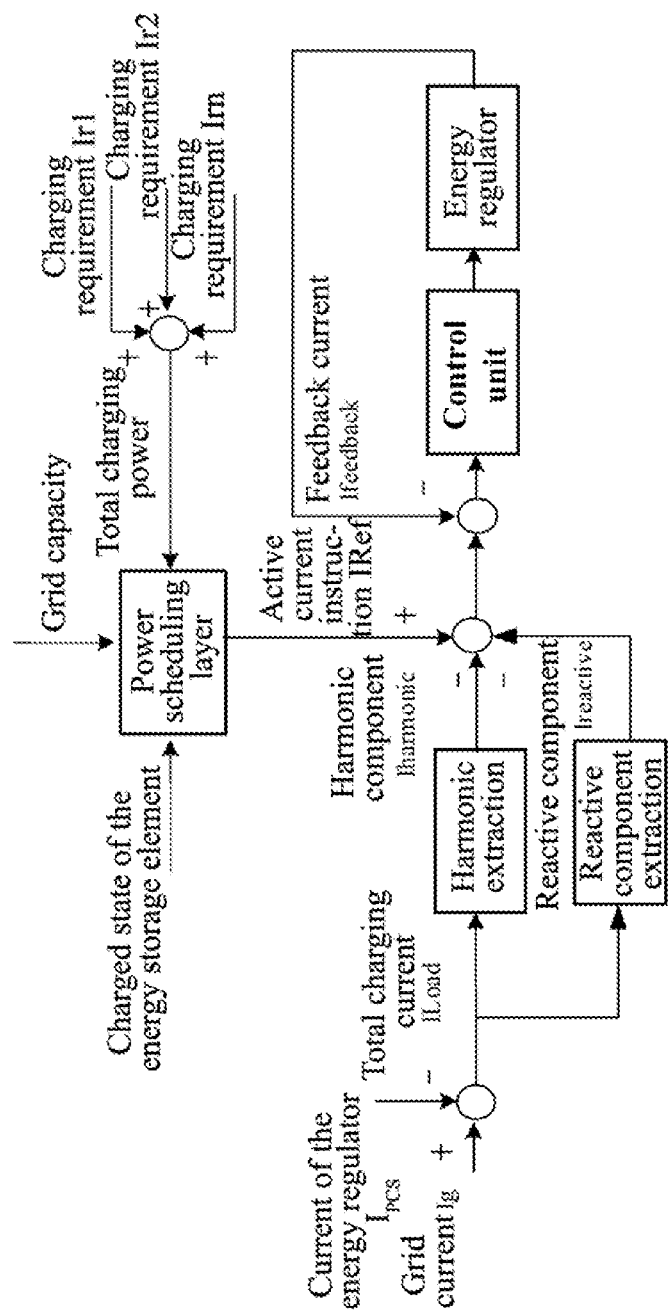
FIG. 9 is a control principle diagram of a controller in a charging device according to the embodiment shown in FIG. 8 of the present disclosure.

FIG. 9 is a control principle diagram of the controller in the charging device according to the embodiment shown in FIG. 8 of the present disclosure. As shown in FIG. 9, the controller includes a harmonic extraction processing unit, a reactive component extraction unit, a current control unit, and a power scheduling layer.

The input current Ig of the primary side of the transformer is used as one input to the adder, the inversion of the AC side current $I_{PCS}$ of the energy regulator is used as the other input to the adder, and the adder outputs the total charging current ILoad. The total charging current ILoad obtains the harmonic component Iharmonic through the harmonic extraction unit, and the total charging current ILoad obtains the reactive component Ireactive through the reactive component extraction unit. The reversed value of the harmonic component Iharmonic is used as the harmonic compensation instruction, and the reversed value of the reactive current Ireactive is used as the reactive compensation instruction.

Obtain the charging requirements Ir1, Ir2, . . . , Irn of multiple charging equipment, take the charging requirement of each charging equipment as an input to the adder, and the total charging requirements output by the charging device is the charging power of the charger. The charging power of the charger, the capacity of the power distribution network, and the charged state of the energy storage element are all used as inputs to the power scheduling layer. The power scheduling layer generates an active power adjustment instruction according to the above three inputs, and uses the active power adjustment instruction to obtain an active current instruction.

The active current instruction is used as one input to the adder, the harmonic compensation instruction is used as one input to the adder, the reactive compensation instruction is used as another input to the adder, and the adder outputs the compensation instruction.

After obtaining the compensation instruction, the current control unit is used to control the AC side current of the energy regulator, which makes the AC side current of the energy regulator track the compensation instruction so as to realize the active component compensation, the harmonic component compensation and reactive component compensation.

As a specific implementation, according to the charging power of the charger, the capacity of the power distribution network and the charged state of the energy storage element, the power scheduling layer obtains the active current instruction in following ways.

Determine whether the capacity of the power distribution network is less than the charging power. If the capacity of the power distribution network is less than the charging power and the charged state of the energy storage element is greater than the lower limit, the difference between the charging capacity and the capacity of the power distribution network is used as the active power adjustment instruction, and the energy storage element discharges. If the capacity of the power distribution network is greater than the charging power and the charged state of the energy storage element is less than the upper limit, the energy storage element is charged. Compare the difference between the capacity of the power distribution network and the charging capacity with the capacity of the energy storage unit, when the difference between the capacity of the power distribution network and the charging capacity is less than the capacity of the energy storage unit, the difference between the capacity of the distribution network and the charging capacity is used as the active power adjustment instruction; when the difference between the capacity of the power distribution network and the charging capacity is greater than the capacity of the energy storage unit, the capacity of the energy storage unit is used as the active power adjustment instruction. The capacity of a general energy storage unit is determined by the capacity of the energy regulator. The above lower limit and upper limit are set according to user requirements. The active power adjustment instruction is divided by the voltage to obtain the active current instruction.

In the charging device provided by this embodiment, the capacity of the power grid is expanded by an energy regulator and a controller, which is especially suitable for urban charging stations where power distribution line expansion costs are high and construction is difficult, such as bus stops. When the charging load is too large, the active power can be shared for the public power grid to delay the upgrade of the power distribution network. At the same time, the energy regulator and controller can perform power factor correction and harmonic compensation on the entire charging device to improve the power factor and reduce harmonic components, thereby achieving high power output of the charging system, while ensuring the quality of grid-connection, reducing the load on the public power grid, and ensuring the stable and efficient operation of the high power charging equipment. In addition, the device only needs to monitor the electrical signals of the power grid side, the energy regulator, the charger, and the energy storage element, which can avoid adding a large number of hardware sampling circuits, thereby simplifying the device.

Figure 10:
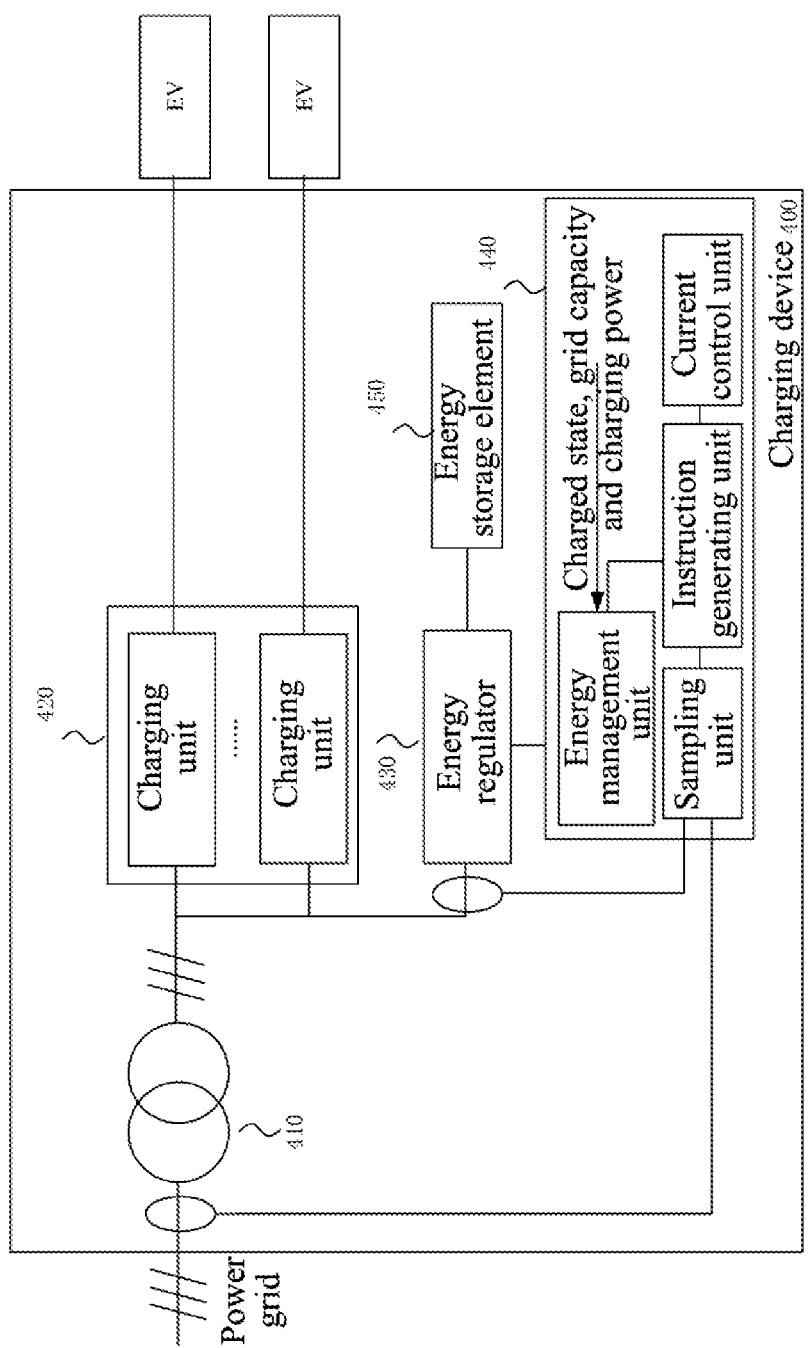
FIG. 10 is a schematic structural diagram of a charging device according to still another exemplary embodiment of the present disclosure.

FIG. 10 is a schematic structural diagram of a charging device according to still another exemplary embodiment of the present disclosure. As shown in FIG. 10, the charging device 400 provided in this embodiment includes a transformer 410, a charger 420, an energy regulator 430, and a controller 440. The charger 420 includes a plurality of charging units. The controller includes a sampling unit, an energy management unit, an instruction generating unit, and a current control unit.

In the above charging device 400, the secondary winding of the transformer 410 is connected to the AC side of the energy regulator 430 and the AC side of the charger 420, and the AC inputs of multiple charging units are all connected to the secondary winding of the transformer 410.

In the above charging device 400, the first sampling end of the sampling unit is located on the AC side of the energy regulator to collect the current signal on the AC side of the energy regulator, and a second sampling end of the sampling unit is located on the primary side of the transformer 410 to collect the total current signal of the primary winding in the transformer 410.

If the general application environment is determined, the capacity of the power distribution network is fixed and can be directly input to the energy management unit. The energy management unit communicates with the charger or with each charging unit in the charger to obtain the charging power of the charger. Specifically, the charging unit communicates with a corresponding load or a charging equipment (such as an electric vehicle, a charging pile) to obtain the charging requirement of each load. All charging requirements are added to obtain the charging power, and the charging power is uploaded to the controller. Collect electrical signals at the output end of the energy storage element (such as the output voltage of the energy storage element) or communicate with the battery management system (BMS) of the energy storage element to obtain the charged state of the energy storage element. Of course, the charging power and the charged state of the energy storage element can also be obtained by directly sampling the electrical signal, which is not limited here.

The operation modes of the energy management unit, the instruction generating unit, and the current control unit are similar to that of the embodiment shown in FIG. 8, and will not be repeated here.

In the charging device provided in this embodiment, since the energy regulator and the charging unit are directly connected in parallel, it is not necessary to increase the transformer capacity while expanding the capacity of the power grid. But the transformer is in the form of double windings, which only realizes the electrical isolation between the power grid and the load, while the isolation between vehicles is realized by the charging module itself.

Figure 11:
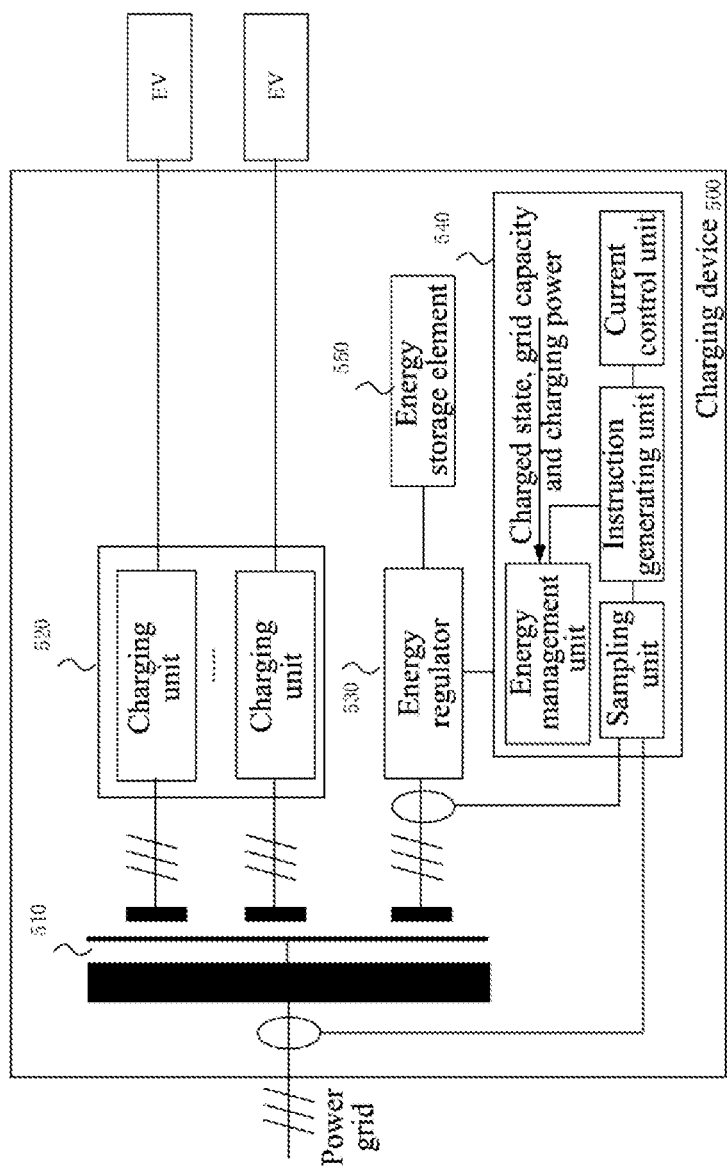
FIG. 11 is a schematic structural diagram of a charging device according to a further exemplary embodiment of the present disclosure.

FIG. 11 is a schematic structural diagram of a charging device according to a further exemplary embodiment of the present disclosure. As shown in FIG. 11, the charging device 500 provided in this embodiment includes a multi-winding transformer 510, a charger 520, an energy regulator 530, and a controller 540. The charger 520 includes N charging units.

In the above charging device 500, the multi-winding transformer 510 has N+1 sets of secondary windings, one set of the secondary windings of the multi-winding transformer 510 is connected to the AC side of the energy regulator 520, and the other N sets of secondary windings of the multi-winding transformer 510 are connected to the AC side of N charging units one by one.

In the above charging device 500, the first sampling end of the sampling unit is located on the AC side of the energy regulator to collect the current signal on the AC side of the energy regulator 530, and a second sampling end of the sampling unit is located on the primary side of the transformer 510 to collect the current signal on the AC side of the transformer 510.

If the general application environment is determined, the capacity of the power distribution network is fixed and can be directly input to the energy management unit. The energy management unit communicates with the charger 520 or with each charging unit in the charger 520 to obtain the charging power of the charger 520. Specifically, the charging unit communicates with a corresponding load or a charging equipment (such as an electric vehicle, a charging pile) to obtain the charging requirement of each load. All charging requirements are added to obtain the charging power, and the charging power is uploaded to the controller 540. Collect electrical signals at the output end of the energy storage element 550 (such as the output voltage of the energy storage element 550) or communicate with the battery management system (BMS) of the energy storage element 550 to obtain the charged state of the energy storage element 550. Of course, the charging power and the charged state of the energy storage element 550 can also be obtained by directly sampling the electrical signal, which is not limited here.

The operation modes of the energy management unit, the instruction generating unit, and the current control unit are similar to that of the embodiment shown in FIG. 8, and will not be repeated here.

In the charging device provided in this embodiment, a capacity expansion function and a harmonic compensation function are provided, and each charging unit is connected to different transformer windings to achieve isolation from each other. Therefore, the charging unit can adopt a non-isolated topology, thereby improving power density and charging efficiency.

Figure 12:
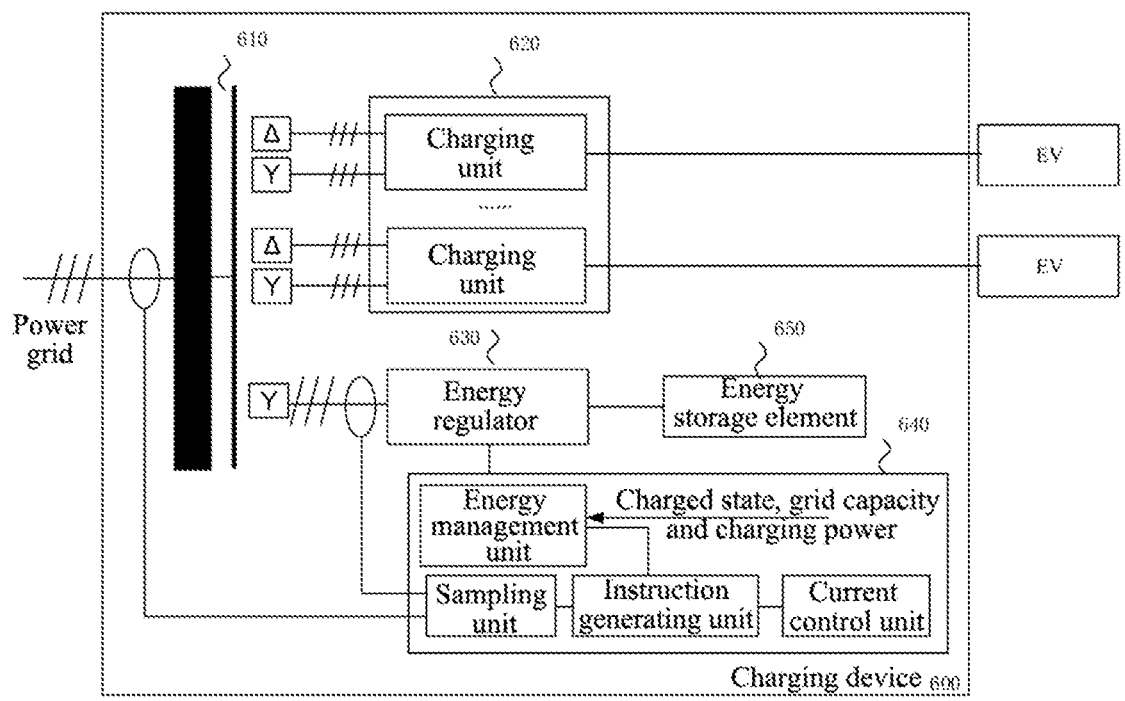
FIG. 12 is a schematic structural diagram of a charging device according to yet a further exemplary embodiment of the present disclosure.

At present, there are solutions to use a phase-shifting transformer to implement multi-pulse rectification to increase the power factor of the system and reduce the harmonic content. For example, the charging device adopts phase-shifting 12-pulse rectification scheme, and there is a 30-degree phase difference between the two sets of secondary windings of the transformer. In this architecture, although the current of the secondary winding of the transformer still has a large harmonic content, the higher harmonics will cancel each other out when the currents of the two sets of secondary windings are converted to the primary side. The power factor on the power grid side is improved, the harmonic content is reduced, and the current THD of power grid side can be suppressed at 6% to 7%, which has been significantly improved compared with the uncontrolled rectification solution, but it still cannot meet the grid-connection requirements in some areas. On this basis, the number of secondary windings is increased continuously. For example, on the basis of star connection and triangle connection, an extended triangular winding is added so that the phase difference between the four windings is 15 degrees. At this point, the system constitutes a 24-pulse rectification, and the harmonic content converted to the primary side of the transformer can be further offset. FIG. 12 is a schematic structural diagram of a charging device according to yet a further exemplary embodiment of the present disclosure. As shown in FIG. 12, the charging device 600 provided in this embodiment includes a multi-winding transformer 610, a charger 620, an energy regulator 630, and a controller 640. The charger 620 includes N charging units.

In the above charging device 600, the multi-winding transformer has 2N+1 sets of secondary windings; a set of secondary windings of the multi-winding transformer is connected to the AC side of the energy regulator 630, the other 2N sets of secondary windings of the multi-phase transformer 620 are connected to the AC side of the charger 620, each two sets of secondary windings of the multi-winding transformer 610 are connected to the AC side of a charging unit, and two of the three phases on the AC side of the charging unit are connected to two sets of secondary windings, where the winding connection of the two sets of secondary windings connected to the AC side of a same charging unit are different. As shown in FIG. 12, there is a 30-degree phase difference between the two inputs, so the single-module 12-pulse rectification can be achieved. The transformer windings are triangular connection and star connection respectively.

In practice, it is not limited to this connection method, and pulse rectification such as 24, 36 can be realized by phase shifting of other angles, thereby further improving the module power factor. For example, on the basis of star connection and triangle connection, an extended triangle winding is added so that the phase difference of the four windings is 15 degrees. At this point, the system constitutes a 24-pulse rectification, and the harmonic content converted to the primary side of the transformer can be further offset.

In the above charging device 600, the first sampling end of the sampling unit is located on the AC side of the energy regulator 630 to collect the current signal on the AC side of the energy regulator 630, and a second sampling end of the sampling unit is located on the primary side of the transformer 610 to collect the current signal on the AC side of the transformer 610.

If the general application environment is determined, the capacity of the power distribution network is fixed and can be directly input to the energy management unit. The energy management unit communicates with the charger 620 or with each charging unit in the charger 620 to obtain the charging power of the charger 620. Specifically, the charging unit communicates with a corresponding load or a charging equipment (such as an electric vehicle, a charging pile) to obtain the charging requirement of each load. All charging requirements are added to obtain the charging power, and the charging power is uploaded to the controller 640. Collect electrical signals at the output end of the energy storage element (such as the output voltage of the energy storage element) or communicate with the battery management system (BMS) of the energy storage element to obtain the charged state of the energy storage element. Of course, the charging power and the charged state of the energy storage element can also be obtained by directly sampling the electrical signal, which is not limited here.

The operation modes of the energy management unit, the instruction generating unit, and the current control unit are similar to that of the embodiment shown in FIG. 8, and will not be repeated here.

In the charging device provided in this embodiment, based on the multi-winding transformer, multi-pulse rectification that is achieved by using phase-shifting technology can replace the active PFC circuit and improve the power density and charging efficiency of the charging unit. However, transformer capacity needs to be increased as the capacity of power grid is expanded for the device.

Figure 13:
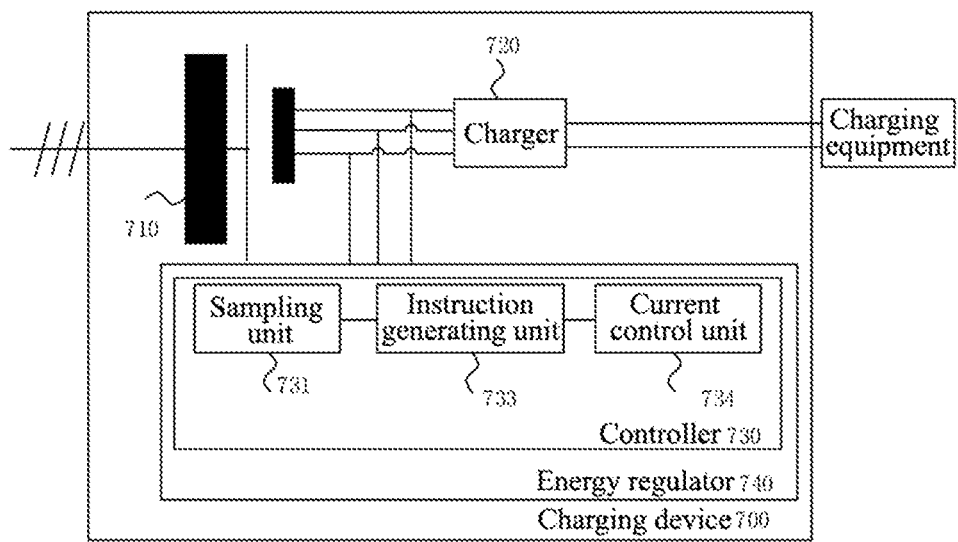
FIG. 13 is a schematic structural diagram of a charging device according to yet a further exemplary embodiment of the present disclosure.

FIG. 13 is a schematic structural diagram of a charging device according to yet a further exemplary embodiment of the present disclosure. As shown in FIG. 13, the controller 730 in the charging device 700 shown in this embodiment is located inside the energy regulator 740, and the controller is a local controller of the energy regulator 740. In the charging device shown in FIG. 6, the controller 240 is the main controller of the charging device. The controller 730 in this embodiment has the same functions as the controller 240 in the embodiment shown in FIG. 6. Refer to the above embodiments for the relevant description, which will not be repeated here.

Figure 14:
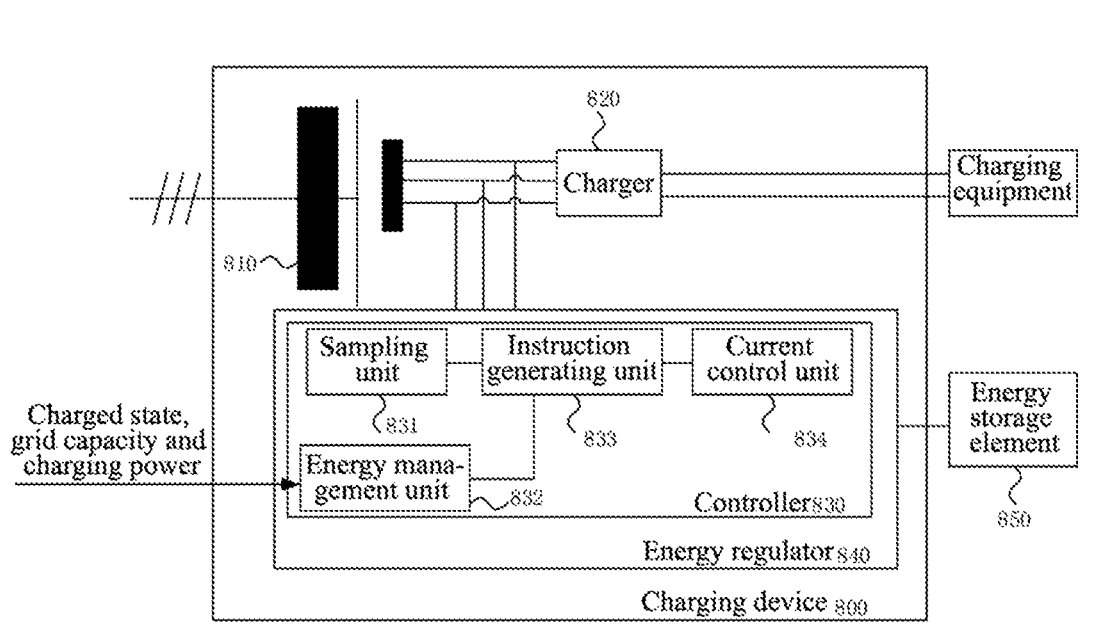
FIG. 14 is a schematic structural diagram of a charging device according to yet a further exemplary embodiment of the present disclosure.

FIG. 14 is a schematic structural diagram of a charging device according to yet a further exemplary embodiment of the present disclosure. As shown in FIG. 14, compared with the charging device shown in FIG. 8, the controller 830 in the charging device 800 shown in this embodiment is located inside the energy regulator 840, and the controller is a local controller of the energy regulator 840. In the charging device shown in FIG. 8, the controller 840 is the main controller of the charging device. The controller 830 in this embodiment has the same functions as the controller 340 in the embodiment shown in FIG. 8. Refer to the above embodiments for the relevant description, which will not be repeated here.

The transformer, charger and energy regulator in the present disclosure are all integrated in one cabinet, the primary side current of the transformer and the AC side current of the energy regulator are collected, and the AC input current of the charger is obtained through calculation. The charger contains multiple charging units, so it is unnecessary to set detection device for each charging unit, thereby saving hardware cost.

In the charging device of the present disclosure, an energy regulator is added to monitor the load of the power grid and energy storage element, regulate the power flow, and expand the capacity of the power grid to meet the possible high power charging requirements; at the same time, the load current waveform of the entire charging device is monitored, and the power grid connection quality of the system is improved through reactive compensation and harmonic compensation. The charging device of the present disclosure can greatly improve the power density of the charging equipment, and has extremely high charging efficiency and better system access quality at the same time.

Figure 15:
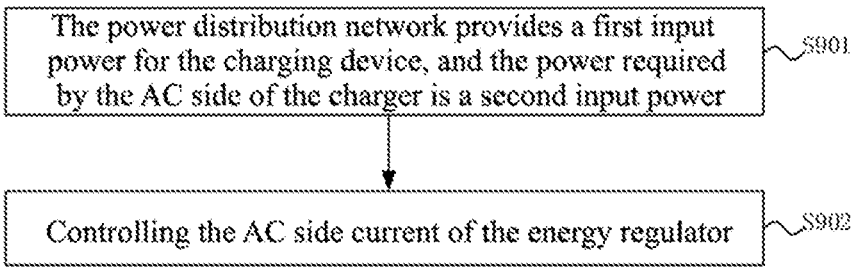
FIG. 15 is a method flowchart of a charging control method according to an exemplary embodiment of the present disclosure.

FIG. 15 is a method flowchart of a charging control method according to an exemplary embodiment of the present disclosure. The charging control method provided in this embodiment is based on the charging device shown in FIG. 5 and FIG. 6 described above. As shown in FIG. 15, the method provided in this embodiment includes:

S901, the power distribution network provides a first input power for the charging device, and the power required by the AC side of the charger is a second input power.

More specifically, the first input power and the second input power in this embodiment refer to the apparent power.

The controller may collect the electrical signal of the primary winding of the transformer to obtain the first input power provided by the power distribution network for the charging device, or may obtain the first input power provided by the power distribution network for the charging device in other ways.

S902, controlling the AC side current of the energy regulator.

More specifically, the controller generates a compensation instruction, and controls the energy regulator to output the AC side current according to the compensation instruction to compensate the power difference between the second input power and the first input power.

Further, in this embodiment, the controller is a main controller in the charging device, but the controller may also be a local controller in the energy regulator.

Figure 16:
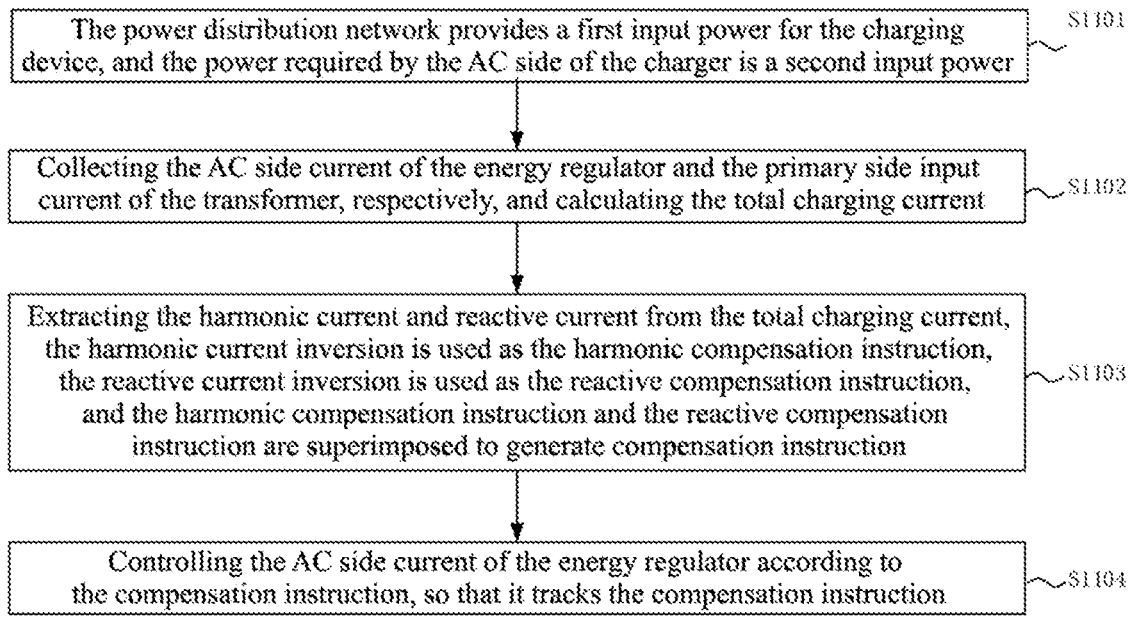
FIG. 16 is a method flowchart of a charging control method according to another exemplary embodiment of the present disclosure.
Figure 17:
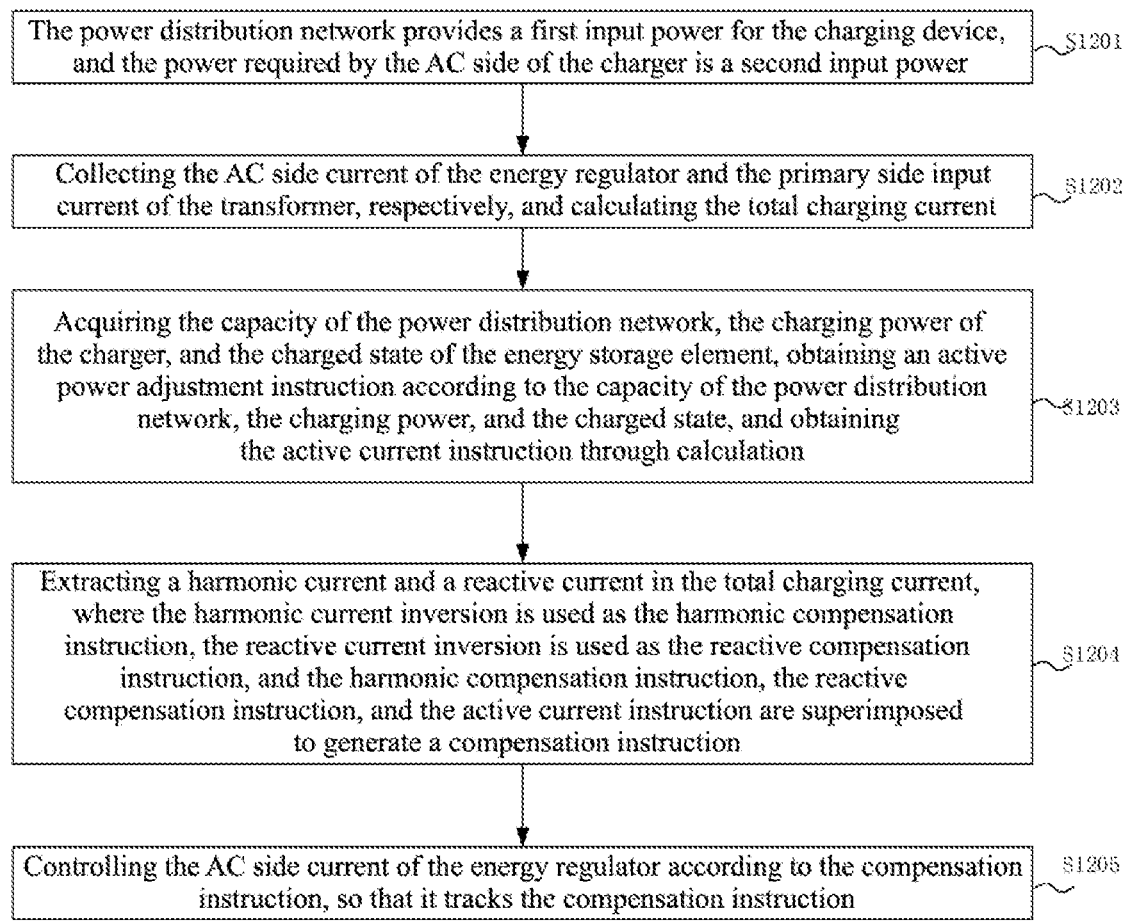
FIG. 17 is a method flowchart of a charging control method according to yet another exemplary embodiment of the present disclosure.

FIG. 16 is a method flowchart of a charging control method according to another exemplary embodiment of the present disclosure. The charging control method provided by this embodiment is based on the charging device shown in FIG. 5 and FIG. 6 described above. As shown in FIG. 17, the charging control method provided in this embodiment includes:

S1101, the power distribution network provides a first input power for the charging device, and the power required by the AC side of the charger is a second input power.

Further, the first input power and the second input power in this embodiment are apparent power.

S1102, collecting the AC side current of the energy regulator and the primary side current of the transformer, respectively, and calculating the total charging current.

More specifically, the AC side current of the energy regulator and the primary side current of the transformer are collected, and the total charging current is obtained by subtracting the AC side current of the energy regulator from the primary side current of the transformer.

S1103, extracting the harmonic current and reactive current from the total charging current, a reversed value of the harmonic current is used as the harmonic compensation instruction, a reversed value of the reactive current is used as the reactive compensation instruction, and the harmonic compensation instruction and the reactive compensation instruction are superimposed to generate compensation instruction.

More specifically, the harmonic current and the reactive current are obtained by the harmonic current extraction method and the reactive current extraction method in the prior art. The reversed value of the harmonic current is used as a harmonic compensation instruction, the reversed value of the reactive current is used as a reactive compensation instruction, and the harmonic compensation instruction and the reactive compensation instruction are superposed to generate a compensation instruction.

S1104, controlling the AC side current of the energy regulator according to the compensation instruction, so that it tracks the compensation instruction.

More specifically, the current control unit is used to control the AC side current of the energy regulator according to the compensation instruction, so that the AC side current of the energy regulator tracks the compensation instruction to compensate the power difference between the second input power and the first input power, where the power difference includes the harmonic component and the reactive component.

FIG. 17 is a method flowchart of a charging control method according to yet another exemplary embodiment of the present disclosure. The charging control method provided by this embodiment is based on the charging device shown in FIG. 8 and FIG. 10 described above. As shown in FIG. 17, the method provided in this embodiment includes:

S1201, the power distribution network provides a first input power for the charging device, and the power required by the AC side of the charger is a second input power.

S1202, collecting the AC side current of the energy regulator and the primary side current of the transformer, respectively, and calculating the total charging current.

S1203, acquiring the capacity of the power distribution network, the charging power of the charger, and the charged state of the energy storage element, obtaining an active power adjustment instruction according to the capacity of the power distribution network, the charging power, and the charged state, and obtaining the active current instruction through calculation.

More specifically, if the general application environment is determined, the capacity of the power distribution network is fixed and can be directly input to the energy management unit. The energy management unit communicates with the charger or with each charging unit in the charger to obtain the charging power of the charger. Specifically, the charging unit communicates with a corresponding load or a charging equipment (such as an electric vehicle, a charging pile) to obtain the charging requirement of each load. All charging requirements are added to obtain the charging power, and the charging power is uploaded to the controller. Collect electrical signals at the output end of the energy storage element (such as the output voltage of the energy storage element) or communicate with the battery management system (BMS) of the energy storage element to obtain the charged state of the energy storage element. Of course, the charging power and the charged state of the energy storage element can also be obtained by directly sampling the electrical signal, which is not limited here.

Determine whether the capacity of the power distribution network is less than the charging power. If the capacity of the power distribution network is less than the charging power and the charged state of the energy storage element is greater than the lower limit, the difference between the charging capacity and the capacity of the power distribution network is used as the active power adjustment instruction, and the energy storage element discharges. If the capacity of the power distribution network is greater than the charging power and the charged state is less than the upper limit, the energy storage element is charged. Compare the difference between the capacity of the power distribution network and the charging capacity with the capacity of the energy storage unit, when the difference between the capacity of the power distribution network and the charging capacity is less than the capacity of the energy storage unit, the difference between the capacity of the distribution network and the charging capacity is used as the active power adjustment instruction; when the difference between the capacity of the power distribution network and the charging capacity is greater than the capacity of the energy storage unit, the capacity of the energy storage unit is used as the active power adjustment instruction. The capacity of the general energy storage unit is determined by the capacity of the energy regulator.

S1204, extracting a harmonic current and a reactive current in the total charging current, where a reversed value of the harmonic current is used as the harmonic compensation instruction, a reversed value of the reactive current is used as the reactive compensation instruction, and the harmonic compensation instruction, the reactive compensation instruction, and the active current instruction are superimposed to generate a compensation instruction.

S1205, controlling the AC side current of the energy regulator according to the compensation instruction, so that it tracks the compensation instruction.

More specifically, the current control unit is used to control the AC side current of the energy regulator according to the compensation instruction, so that the AC side current of the energy regulator tracks the compensation instruction to compensate the power difference between the second input power and the first input power, where the power difference includes the active component, the harmonic component and the reactive component.

Finally, it should be noted that the above embodiments are merely for illustrating, instead of limiting the technical solutions of the present application. Although the present application has been illustrated in detail with reference to the above embodiments, a person ordinarily skilled in the art should understand the technical solutions described in the above embodiments may be modified or equivalently substituted for some or all of the technical features, and the modifications and substitutions should do not cause the essence of the corresponding technical solutions depart from the scope of the technical solutions of the embodiments of the present application.

What is claimed is:

1. A charging device, comprising: a transformer, a charger, an energy regulator, and a controller; wherein, a primary winding of the transformer is connected to a power distribution network, the power distribution network provides a first input power for the charging device;

a secondary winding of the transformer is connected to an alternating current (AC) side of the charger and an AC side of the energy regulator respectively;

power required on the AC side of the charger is a second input power;

the controller is configured to control an AC side current of the energy regulator to compensate power difference between the second input power and the first input power;

wherein the controller is further configured to:

collect the AC side current of the energy regulator and a primary side current of the transformer to calculate a total charging current;

extract a harmonic current and a reactive current in the total charging current, wherein a reversed value of the harmonic current is used as a harmonic compensation instruction, and a reversed value of the reactive current is used as a reactive compensation instruction;

obtain a compensation instruction by superimposing the harmonic compensation instruction and the reactive compensation instruction; and control the AC side current of the energy regulator according to the compensation instruction.

2. The device of claim 1, wherein the power difference comprises harmonic component and reactive component, and the AC side current of the energy regulator is controlled to track the compensation instruction to realize harmonic component compensation and reactive component compensation.

3. The device of claim 1, wherein a direct current (DC) side of the energy regulator is connected to an energy storage element, and the power difference comprises active component, harmonic component, and reactive component.

4. The device of claim 3, wherein the controller is further configured to:

acquire capacity of the power distribution network, charging power of the charger, and charged state of the energy storage element; obtain an active current instruction according to the capacity of the power distribution network, the charging power, and the charged state; and obtain the compensation instruction by superimposing the harmonic compensation instruction, the reactive compensation instruction and the active current instruction.

5. The device of claim 4, wherein, if the capacity of the power distribution network is less than the charging power and the charged state is greater than a lower limit, the energy storage element discharges.

6. The device of claim 4, wherein, if the capacity of the power distribution network is greater than the charging power and the charged state is less than an upper limit, the energy storage element is charged.

7. The device of claim 1, wherein the controller is a main controller of the charging device, or the controller is set inside the energy regulator and is a local controller of the energy regulator.

8. The device of claim 1, wherein the transformer is a phase-shifting transformer;

the charger comprises N charging sub-circuits, and the phase-shifting transformer is provided with 2N+1 sets of secondary windings;

wherein one set of secondary windings of the phase-shifting transformer is connected to the AC side of the energy regulator;

for each charging sub-circuit, an AC side of the charging sub-circuit is connected to two sets of secondary windings of the phase-shifting transformer.

9. The device of claim 1, wherein the transformer is a multi-winding transformer;

the charger comprises N charging sub-circuits, and the multi-winding transformer is provided with N+1 sets of secondary windings;

wherein one set of secondary windings of the multi-winding transformer is connected to the AC side of the energy regulator;

for each charging sub-circuit, an AC side of the charging sub-circuit is connected to one corresponding set of secondary windings of the other N sets of secondary windings of the multi-winding transformer.

10. The device of claim 8, wherein winding connection of the two sets of secondary windings connected to a same charging sub-circuit are different.

11. The device of claim 1, wherein the transformer comprises a set of secondary windings, the secondary windings are respectively connected to the AC side of the charger and the AC side of the energy regulator, and a converter in the charger is an isolated converter.

12. The device of claim 4, wherein the AC side current of the energy regulator is controlled to track the compensation instruction to realize active component compensation, harmonic component compensation and reactive component compensation.

13. A charging control method, based on a charging device, the charging device comprises: a transformer, a charger, an energy regulator and a controller, wherein a primary winding of the transformer is connected to a power distribution network; a secondary winding of the transformer is respectively connected to an alternating current (AC) side of the charger and an AC side of the energy regulator; the method comprises:

providing, by the power distribution network, a first input power for the charging device;

controlling, by the controller, an AC side current of the energy regulator to compensate power difference between the first input power and a second input power required on the AC side of the charger;

wherein the controlling, by the controller, the AC side current of the energy regulator comprises:

collecting the AC side current of the energy regulator and a primary side current of the transformer to calculate a total charging current;

extracting a harmonic current and a reactive current in the total charging current, wherein a reversed value of the harmonic current is used as a harmonic compensation instruction, and a reversed value of the reactive current is used as a reactive compensation instruction;

obtaining a compensation instruction by superimposing the reactive compensation instruction and the harmonic compensation instruction; and controlling the AC side current of the energy regulator according to the compensation instruction.

14. The method of claim 13, wherein the power difference comprises harmonic component and reactive component, and the controlling the AC side current of the energy regulator according to the compensation instruction comprises:

controlling the AC side current of the energy regulator to track the compensation instruction to realize harmonic component compensation and reactive component compensation.

15. The method of claim 13, wherein the charging device further comprises an energy storage element, and a direct current (DC) side of the energy regulator is connected to the energy storage element; the power difference comprises active component, harmonic component, and reactive component.

16. The method of claim 15, wherein the controlling, by the controller, the AC side current of the energy regulator further comprises:
 acquiring capacity of the power distribution network, charging power of the charger, and charged state of the energy storage element;
 obtaining an active current instruction according to the capacity of the power distribution network, the charging power, and the charged state;
 wherein the obtaining the compensation instruction by superimposing the reactive compensation instruction and the harmonic compensation instruction comprises:
 obtaining the compensation instruction by superimposing the active current instruction, the reactive compensation instruction and the harmonic compensation instruction.

17. The method of claim 16, wherein,
 if the capacity of the power distribution network is less than the charging power and the charged state is greater than a lower limit, the energy storage element discharges.

18. The method of claim 16, comprising:
 if the capacity of the power distribution network is greater than the charging power and the charged state is less than an upper limit, the energy storage element is charged.

19. The device of claim 16, wherein the controlling the AC side current of the energy regulator according to the compensation instruction comprises: controlling the AC side current of the energy regulator to track the compensation instruction, thereby realizing active component compensation, harmonic component compensation and reactive component compensation.

* * * * *